US008342131B2

(12) United States Patent  (10) Patent No.: US 8,342,131 B2
McPherson  (45) Date of Patent: Jan. 1, 2013

(54) URBAN ADVENTURE PLAYGROUND

(76) Inventor: Dawn McPherson, Airdrie (CA)

(*) Notice: Subject to any disclaimer, the term of this patent is extended or adjusted under 35 U.S.C. 154(b) by 423 days.

(21) Appl. No.: 12/606,625

(22) Filed: Oct. 27, 2009

(65) Prior Publication Data

US 2010/0101501 A1    Apr. 29, 2010

Related U.S. Application Data

(60) Provisional application No. 61/197,556, filed on Oct. 28, 2006.

(51) Int. Cl.
*A01K 1/02* (2006.01)

(52) U.S. Cl. .......................... 119/436; 119/482; 119/706

(58) Field of Classification Search .................. 119/436, 119/452, 472, 482, 484, 485–486, 706, 702
See application file for complete search history.

(56) References Cited

U.S. PATENT DOCUMENTS

| | | | | |
|---|---|---|---|---|
| 1,462,107 A * | 7/1923 | Holman | ........................ | 119/513 |
| 2,795,208 A * | 6/1957 | Rasmussen | .................... | 119/486 |
| 3,485,494 A * | 12/1969 | Lieberman | ...................... | 482/35 |
| 3,653,357 A * | 4/1972 | Sheidlower et al. | ........... | 119/6.5 |
| 3,742,908 A * | 7/1973 | Merino | ........................ | 119/455 |
| D246,914 S * | 1/1978 | Dinnerstein et al. | .......... | D30/112 |
| 4,347,807 A * | 9/1982 | Reich | ............................ | 119/499 |
| D270,297 S * | 8/1983 | Lovitt | .......................... | D30/108 |
| D292,032 S * | 9/1987 | Margolis | ....................... | D30/112 |
| 5,186,122 A * | 2/1993 | Phillips et al. | ................ | 119/474 |
| 5,226,864 A * | 7/1993 | Showers | .......................... | 482/35 |
| D347,913 S * | 6/1994 | Wellington et al. | .......... | D30/108 |
| D364,489 S | 11/1995 | Cook | | |
| 5,465,682 A | 11/1995 | Chavallo, Jr. | | |
| 5,551,372 A | 9/1996 | Nicholls | | |
| 5,664,524 A * | 9/1997 | Piglia et al. | .................... | 119/452 |
| 5,711,253 A | 1/1998 | Phillips et al. | | |
| 5,806,464 A | 9/1998 | Willinger et al. | | |
| D422,754 S | 4/2000 | Kolozsvari et al. | | |
| 6,044,799 A * | 4/2000 | Tominaga | ...................... | 119/472 |
| 6,123,047 A * | 9/2000 | Sakai | ............................. | 119/452 |
| 6,318,295 B1 * | 11/2001 | Wade | ............................. | 119/500 |
| D461,937 S | 8/2002 | Small | | |
| 6,431,119 B1 * | 8/2002 | Beymer | ......................... | 119/485 |
| 6,668,757 B2 * | 12/2003 | Marchioro | ..................... | 119/452 |
| 7,337,748 B1 * | 3/2008 | Morris | ............................ | 119/482 |

* cited by examiner

*Primary Examiner* — Kimberly Berona
(74) *Attorney, Agent, or Firm* — James Ray & Assoc

(57) ABSTRACT

A recreational structure for providing a cat with adequate shelter and play area. The structure comprises a central main living unit that connects to a rectangular litter housing member by means of hollow tubes. A multi-tiered unit is disposed on top the main living unit. The top tier of this unit connects to the first tube by means of a slanted second tube. An entrance/exit member provides access to the structure. This member is connected to the bottom tier of the multi-tiered unit by a third tube. The tiers connect to one another by means of stairs.

7 Claims, 6 Drawing Sheets

US 8,342,131 B2

URBAN ADVENTURE PLAYGROUND

CROSS REFERENCE TO RELATED APPLICATIONS

This application is closely related to and claims benefit from U.S. Provisional Application Ser. No. 61/197,556 filed Oct. 28, 2008.

FIELD OF THE INVENTION

The present invention relates, in general, to a playground, and, more particularly, the present invention relates to an urban adventure playground that includes an enclosed structure composed of tubes, slides and platforms for playful cats.

STATEMENT REGARDING FEDERALLY SPONSORED RESEARCH OR DEVELOPMENT

N/A

BACKGROUND

Outdoor felines roam endlessly around neighborhoods. Unless a pet owner constructs a shelter for the cats, the pets remain unprotected from the elements and other animals. The cats will generally adapt to their natural environments by finding survival means. They may travel from their homes in these cases, and streets and towns become filled with cats that have strayed. Pets that are provided with well maintained, sophisticated structures would remain around their homes. However, the problem that exists is there are no such structures available on the market.

Thus, it would be advantageous if there were a structure containing multiple tubes platforms and cages that provide the cat(s) with an adequate shelter and play area.

BRIEF SUMMARY OF THE INVENTION

In a first aspect the present invention provides a structure for providing a pet cat with an adequate shelter and play area, the structure comprises a central housing unit having a first predetermined shape and formed of a first predetermined material. A liter box housing is spaced a predetermined distance from a first side of the central housing unit and has a second predetermined shape and is formed of a second predetermined material. There is a first connecting means connected on a first end thereof to an end of the litter box housing and at a second end thereof to the central housing unit for providing a cat access therebetween. A multi-tiered structure is disposed on top of the central housing unit having a third predetermined shape and being formed of a third predetermined material. A second connecting means is connected on a first end thereof to an upper tier of the multi-tiered structure and connected on a second end thereof to the first connecting means closely adjacent a first end thereof. An entrance and exit structure is spaced a predetermined distance from a second side of the central housing unit and has a fourth predetermined shape and formed of a fourth predetermined material. The entrance and exit structure includes a lockable door to provide access to the structure by a cat. A third connecting means is connected on a first end thereof to a lower tier of the multi-tiered structure and on a second end thereof to the entrance and exit structure for providing a cat access therebetween.

OBJECTS OF THE INVENTION

It is, therefore, one of the primary objects of the present invention to provide a recreational structure for pet cats.

Another object of the present invention is to provide an recreational structure for cats wherein the structure contains a central housing, an litter box housing and an entrance and exit unit.

Still another object of the present invention is to provide a recreational structure wherein the different units are connected by substantially hollow tubes for providing a cat access therebetween.

In addition to the various objects and advantages of the invention which have been described in some specific detail above it should be noted that various other objects and advantages of the present invention will become more readily apparent to those persons who are skilled in the relevant art from the following more detailed description, particularly when such description is taken in conjunction with the appended claims.

DETAILED DESCRIPTION OF INVENTION

Figure 1:
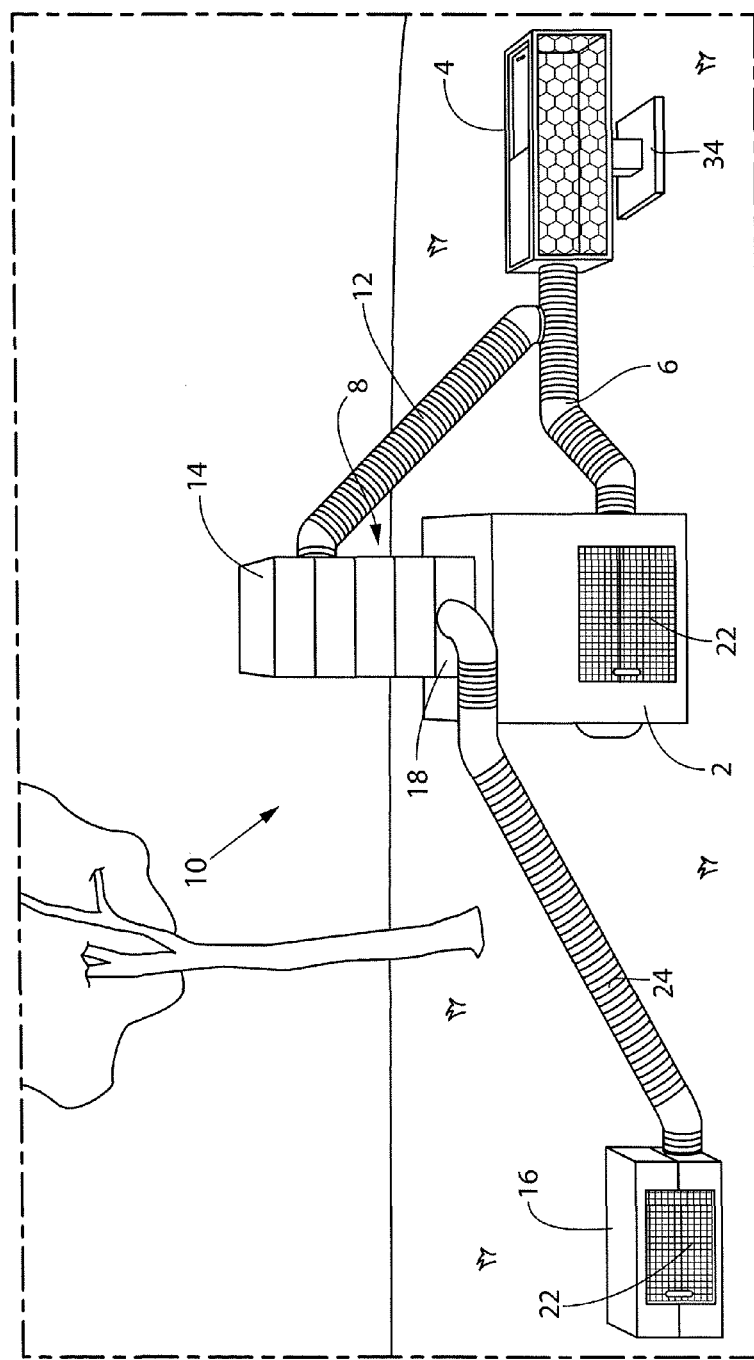
FIG. 1 is a side perspective side view of the playground structure according to an embodiment of the invention as used in an outdoor setting.
Figure 2:
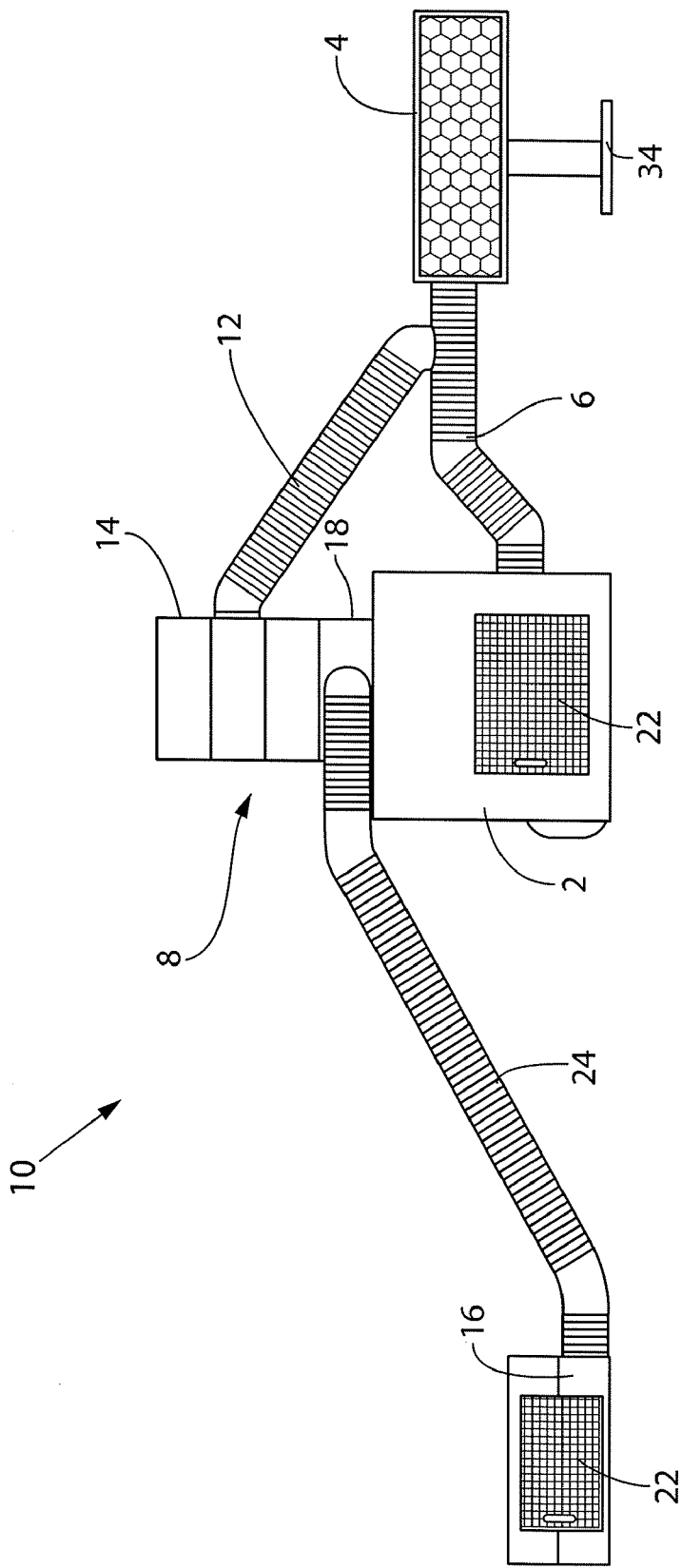
FIG. 2 is a side view of the structure shown in FIG. 1 for use indoors.
Figure 3:
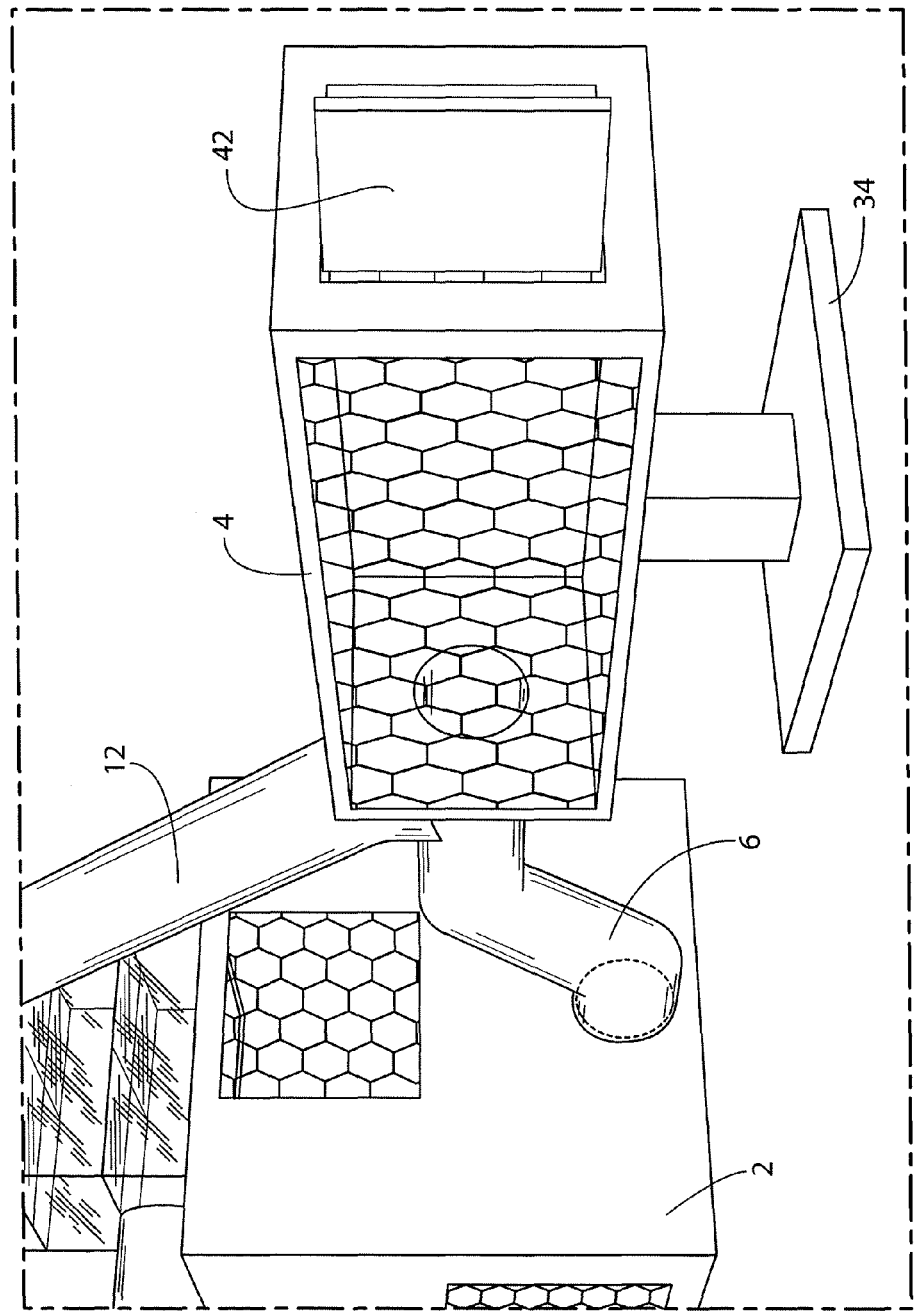
FIG. 3 is a side perspective view of the litter box housing of the structure shown in FIG. 1 showing a swinging cat door disposed on an end.
Figure 4:
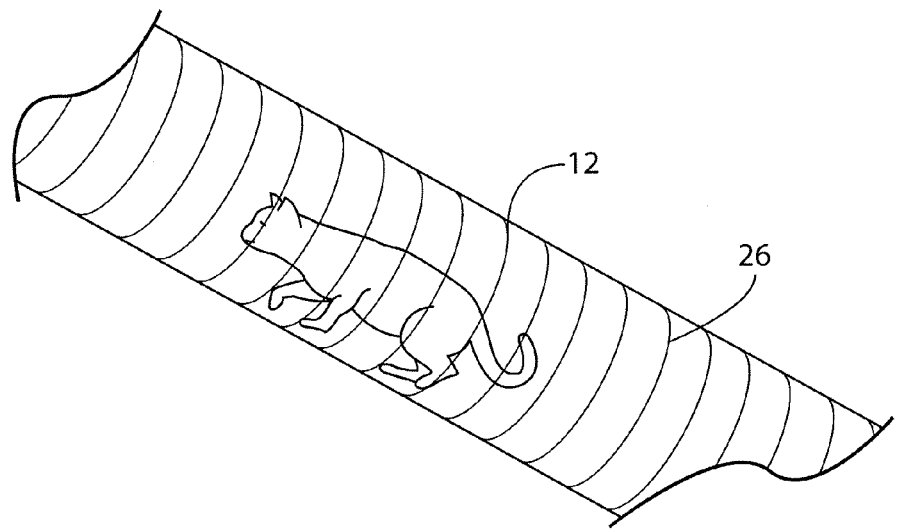
FIG. 4 is an enlarged view of the slanted second tube showing a cat climbing the tube and the ribbed interior of the tube.

Prior to proceeding with the more detailed description of the present invention it should be noted that, for the sake of clarity, identical components which have identical functions have been designated by identical reference numerals throughout the several views illustrated in the drawings.

In a first aspect the present invention provides a structure, generally designated 10, for providing a pet cat with an adequate shelter and play area. The structure 10 comprises a central housing unit 2 having a first predetermined shape and formed of a first predetermined material. A liter box housing 4 is spaced a predetermined distance from a first side of the central housing unit 2 and has a second predetermined shape and is formed of a second predetermined material. There is a first connecting means 6 connected on a first end thereof to an end of the litter box housing 4 and at a second end thereof to the central housing unit 2 for providing a cat access therebetween. A multi-tiered structure 8 is disposed on top of the central housing unit 2 having a third predetermined shape and being formed of a third predetermined material. A second connecting means 12 is connected on a first end thereof to an upper tier 14 of the multi-tiered structure 8 and connected on a second end thereof to the first connecting means 6 closely adjacent a first end thereof. An entrance and exit structure 16 is spaced a predetermined distance from a second side of the central housing unit 2 and has a fourth predetermined shape and formed of a fourth predetermined material. The entrance and exit structure 16 includes a lockable door 22 to provide access to the structure by a cat. A third connecting means 24 is connected on a first end thereof to a lower tier 18 of the multi-tiered structure 8 and on a second end thereof to the entrance and exit structure 16 for providing a cat access therebetween.

It should be noted that each tier of the multi-tiered structure 8 is accessible to an adjacent tiers. The tiers are not sufficiently high that a cat cannot jump from one tier to the adjacent tier.

It is presently preferred that the first connecting means 6, the second connecting means 12 and the third connecting means 24 are substantially hollow tubes and that each tube in the structure 10 and are ribbed 26 so a cat can navigate through each tube safely.

Such central housing unit 2 further includes bedding, toys and food and water bowls 28.

Figure 5:
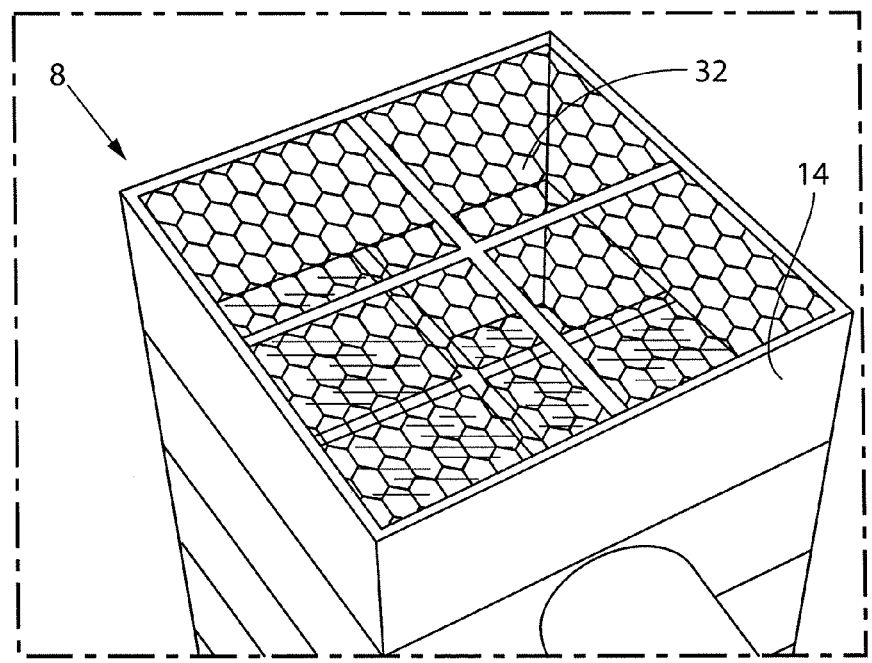
FIG. 5 is an enlarged perspective view of the top tier of the multi-tiered structure showing the top or roof being clear allowing light and suns rays to enter.

As can be seen in FIG. 5 a roof 32 of the upper tier 14 of the multi-tiered structure 8 is clear so as to permit sun's rays and light to enter the upper tier 14.

At least a portion of the walls of the litter box housing 4 are formed of open grates so as to permit ventilation in the litter box housing 4.

Figure 6:
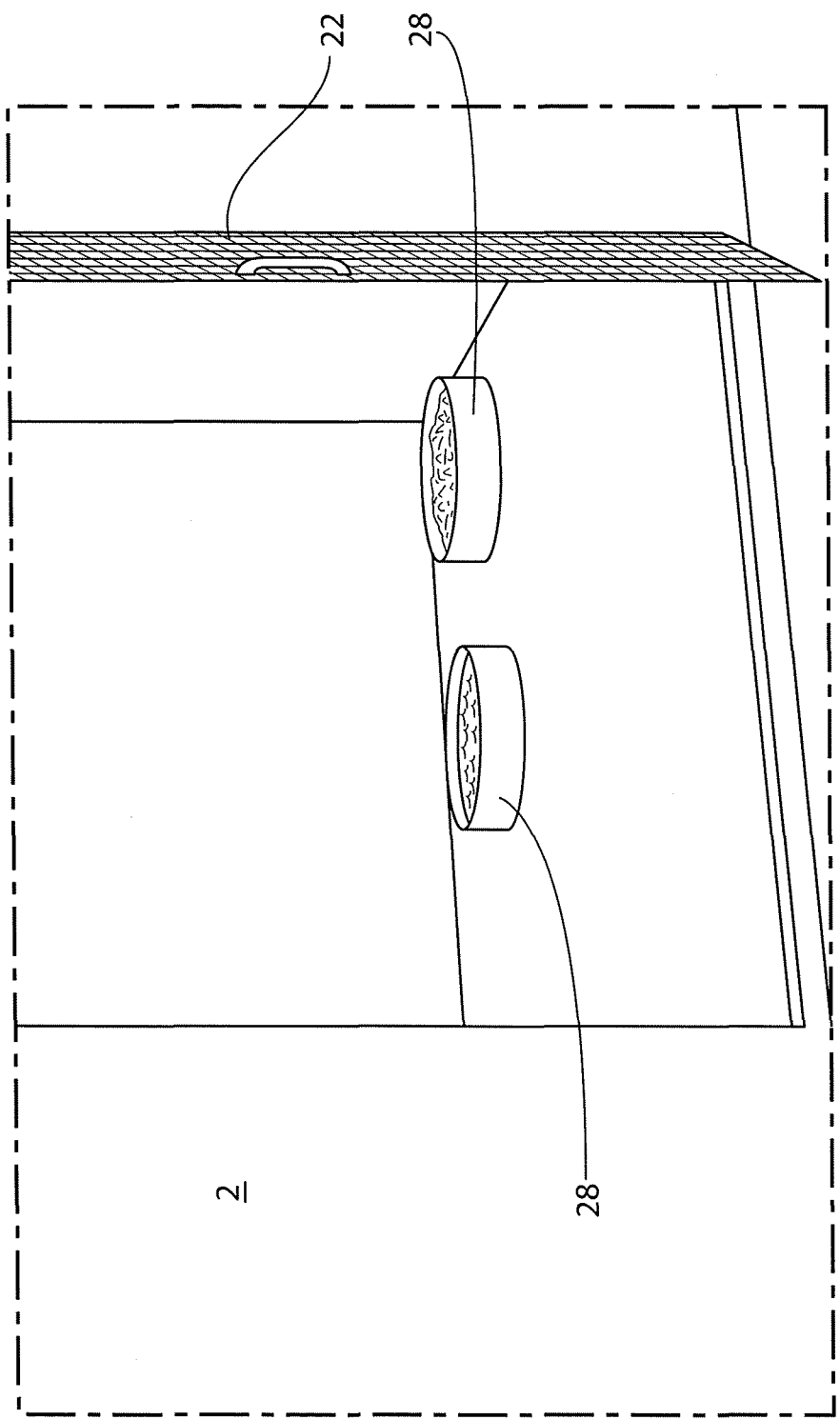
FIG. 6 is an enlarged view of part of the central housing unit showing a portion of a wall being open grated to permit ventilation and having a lockable door disposed on the housing unit showing the cats feeding bowls.
Figure 7:
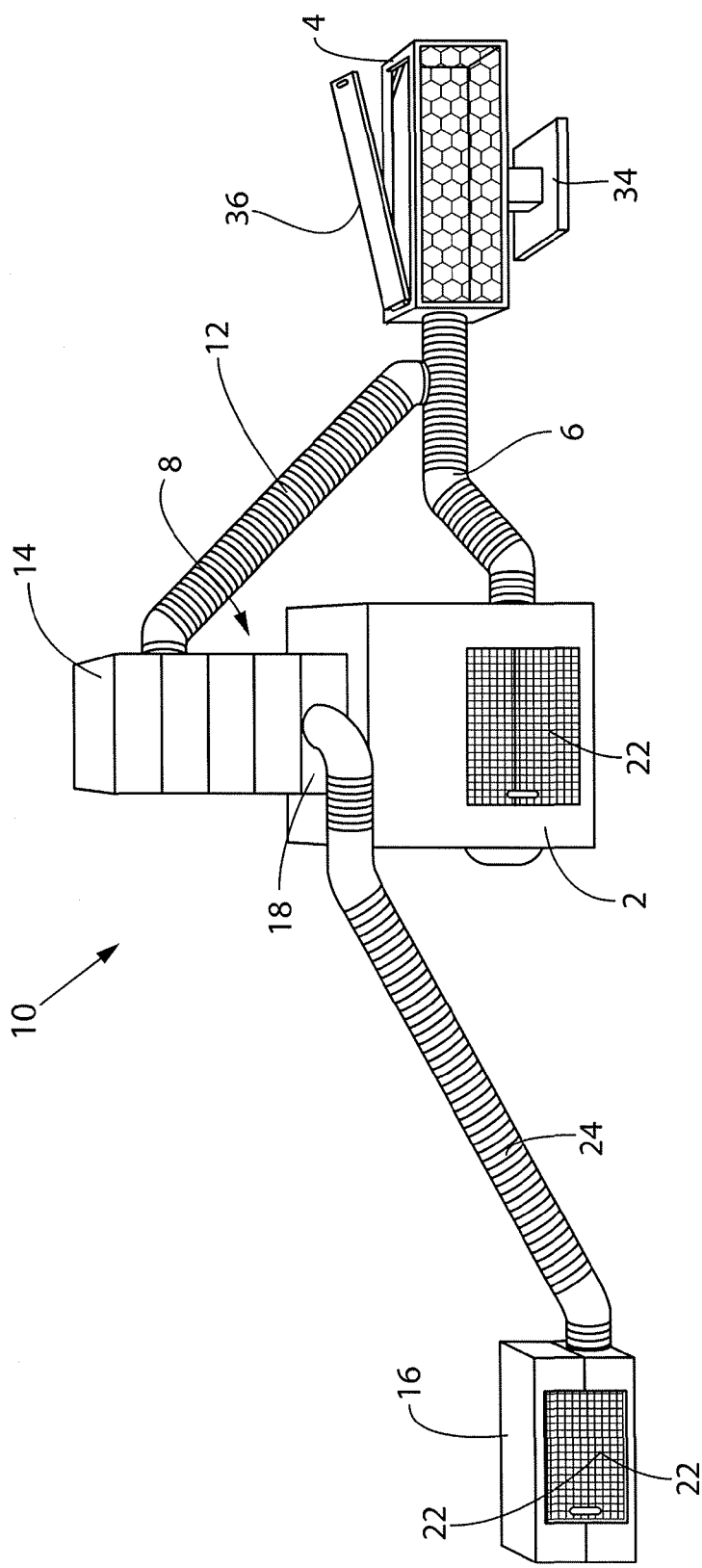
FIG. 7 is a side perspective view of the structure showing an easy access door to the litter box for easy maintenance of the litter box.

The central housing unit 2 further includes an entrance and exit lockable door 22 to permit another access by such cat to the structure. Also as seen in FIG. 6 at least part of a wall of the central housing unit is formed of an open grate so as to permit ventilation therein. Such litter box housing 4 further includes a litter box and such litter box housing includes at least one easily opened door 36 for servicing the litter box. Such litter box housing includes a cat door 42 which is swinging type door.

Such first predetermined shape is one of square, circular, oval and rectangular. It is presently preferred that such shape is either square or rectangular. Such second, third and fourth predetermined shapes are also substantially rectangular. Also such first, second, third and fourth predetermined material is plastic.

It is also preferred that such litter box housing 4 be disposed at least a few inches above the ground level. This is important if the structure 10 is to be used outdoors. The litter box housing 4 is elevated above ground by means of a support frame 34.

While a presently preferred embodiment and alternate embodiments of the present invention have been described in detail above, it should be understood that various other adaptations and/or modifications of the invention can be made by those persons who are particularly skilled in the art without departing from either the spirit of the invention or the scope of the appended claims.

I claim:

1. A recreational and shelter structure for a pet cat, said structure comprising:
   (a) a central housing;
   (b) a lockable door disposed in a first side of said central housing unit and sized to allow access of the pet cat therethrough;
   (c) an open grate portion disposed in a second side of said central housing unit;
   (d) a support frame;
   (e) a litter box housing disposed on said support frame and spaced in a generally horizontal direction a distance from said second side of said central housing unit, said litter box housing having a swing door disposed in a first side thereof, an access in a top portion thereof and at least a portion of side walls formed from open grates;
   (f) a first elongated connecting tube attached on a first end thereof to a second side of said litter box housing and at a second end thereof to said second side of said central housing unit for providing access therebetween, wherein said first elongated connecting tube further has a portion slanted in a generally vertical plane and two horizontal portions surrounding said slanted portion;
   (g) an elongated multi-tiered structure disposed centrally on a portion of a top of said central housing unit and having a base surface thereof being sized substantially less than a surface of said top of said central housing unit, said elongated multi-tiered structure having a meshed top;
   (h) a second elongated connecting tube slanted in said generally vertical plane and attached at a first end thereof to one of upper tiers of said multi-tiered structure and attached at a second end thereof to one of said two horizontal portions of said first elongated connecting tube in proximity to said second side of said litter box housing;
   (i) an entrance and exit structure spaced a distance from a third side of said central housing unit and having a lockable door disposed in a first side thereof and sized to provide access of the pet cat; and
   (j) a third elongated connecting tube having a portion slanted in said generally vertical plane and two horizontal portions surrounding said slanted portion of said third elongated connecting tube, said third elongated connecting tube attached at a first end thereof to a bottom tier of said multi-tiered structure and attached at a second end thereof to a second side of said entrance and exit structure, said second side of said entrance and exit structure being disposed opposite to said second side of said litter box.

2. The structure, according to claim 1, wherein each tier of said multi-tiered structure is accessible to an adjacent tier by means of steps connecting adjacent tiers.

3. The structure, according to claim 1, wherein a roof of said upper tier of said multi-tiered structure is clear so as to permit sun's rays and light to enter said upper tier.

4. The recreational and shelter structure according to claim 1, wherein said elongated connecting tubes are ribbed.

5. The recreational and shelter structure according to claim 1, wherein said litter box further includes a door selectively covering and uncovering said access in said top portion thereof.

6. A recreational and shelter structure for a pet cat, said structure comprising:
   (a) a central housing unit sized to include bedding, toys and water and food bowls;
   (b) a lockable door disposed in a first side of said central housing unit and sized to allow access of the pet cat therethrough, said lockable door having a bottom edge of said lockable door disposed generally parallel to and in close proximity to a bottom edge of said first side of said central housing unit;
   (c) an open grate portion disposed in a second side of said central housing unit, a top edge of said open grate portion disposed generally parallel to and in close proximity to a top edge of said second side of said central housing unit;
   (d) a support frame having a generally planar base member disposed generally horizontally during use of said structure and an elongated member disposed upwardly on said generally planar base member;

(e) a litter box housing disposed on a top end of said elongated member and spaced in a generally horizontal direction a distance from said second side of said central housing unit, said litter box housing having a swing door disposed in a first side thereof, an access in a top portion thereof and at least a portion of side walls formed from open grates;

(f) a first elongated connecting tube attached on a first end thereof to a second side of said litter box housing and at a second end thereof to said second side of said central housing unit below said open grate portion thereof for providing access therebetween, wherein said first elongated connecting tube further has a portion slanted in a generally vertical plane and two horizontal portions surrounding said slanted portion;

(g) an elongated multi-tiered structure disposed centrally on a portion of a top of said central housing unit and having a base surface thereof being sized substantially less than a surface of said top of said central housing unit, said elongated multi-tiered structure having a meshed top;

(h) a second elongated connecting tube slanted in said generally vertical plane and attached at a first end thereof to one of upper tiers of said multi-tiered structure and attached at a second end thereof to one of said two horizontal portions of said first elongated connecting tube in proximity to said second side of said litter box housing;

(i) an entrance and exit structure spaced a distance from a third side of said central housing unit and having a lockable door disposed in a first side thereof and sized to provide access of the pet cat; and (j) a third elongated connecting tube having a portion slanted in said generally vertical plane and two horizontal portions surrounding said slanted portion of said third elongated connecting tube, said third elongated connecting tube attached at a first end thereof to a bottom tier of said multi-tiered structure above said lockable door disposed in said first side of said central housing unit and attached at a second end thereof to a second side of said entrance and exit structure, said second side of said entrance and exit structure being disposed opposite to said second side of said litter box.

7. The recreational and shelter structure according to claim 6, wherein said elongated connecting tubes are ribbed.

\* \* \* \* \*